United States Patent
Cho et al.

(10) Patent No.: US 9,581,876 B1
(45) Date of Patent: Feb. 28, 2017

(54) ELECTROCHROMIC DEVICE

(71) Applicant: ELECTRONICS AND TELECOMMUNICATIONS RESEARCH INSTITUTE, Daejeon (KR)

(72) Inventors: Seong-Mok Cho, Deajeon (KR); Joo Yeon Kim, Daejeon (KR); Tae-Youb Kim, Daejeon (KR); Hojun Ryu, Seoul (KR); Chil Seong Ah, Daejeon (KR); Sang Hoon Cheon, Daejeon (KR); Yong Hae Kim, Daejeon (KR); Juhee Song, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/009,567

(22) Filed: Jan. 28, 2016

(30) Foreign Application Priority Data

Dec. 15, 2015 (KR) ........................ 10-2015-0179438

(51) Int. Cl.
*G02F 1/153* (2006.01)
*G02F 1/15* (2006.01)

(52) U.S. Cl.
CPC .................................. *G02F 1/1525* (2013.01)

(58) Field of Classification Search
CPC ....... G02F 1/1523; G02F 1/1525; G02F 1/155
USPC .................................. 359/265–270; 345/105
See application file for complete search history.

(56) References Cited

U.S. PATENT DOCUMENTS

| | | | |
|---|---|---|---|
| 7,999,992 B2 * | 8/2011 | Mazurkiewicz | G02F 1/1525 359/273 |
| 8,384,983 B2 | 2/2013 | Yashiro et al. | |
| 2007/0153357 A1 | 7/2007 | Noh et al. | |
| 2014/0002881 A1 | 1/2014 | Kim | |
| 2014/0133007 A1 | 5/2014 | Granqvist | |
| 2015/0185580 A1 | 7/2015 | Cho et al. | |

FOREIGN PATENT DOCUMENTS

| KR | 10-2007-0063772 A | 6/2007 |
|---|---|---|
| KR | 10-2007-0070792 A | 7/2007 |

OTHER PUBLICATIONS

Udo Bach, et al., "Nanomaterials-Based Electrochromics for Paper-Quality Displays", Advanced Materials, Jun. 5, 2002, pp. 845-848, vol. 14, No. 11.

* cited by examiner

*Primary Examiner* — Tuyen Tra

(57) ABSTRACT

Provided is an electrochromic device and a method for driving the electrochromic device, the electrochromic device including a first electrode, a first electrochromic layer, an electrolyte layer, a second electrochromic layer, and a second electrode which are laminated in sequence, at least one selected from among the group consisting of the first and second electrochromic layers and the electrolyte layer including scattering particles, and the electrochromic device further including an additional layer that contains the scattering particles and is disposed between the electrolyte layer and the first or second electrochromic layer.

7 Claims, 8 Drawing Sheets

ELECTROCHROMIC DEVICE

CROSS-REFERENCE TO RELATED APPLICATIONS

This U.S. non-provisional patent application claims priority under 35 U.S.C. §119 of Korean Patent Application No. 10-2015-0179438, filed on Dec. 15, 2015, the entire contents of which are hereby incorporated by reference.

BACKGROUND

The present disclosure herein relates to a display, and more particularly to a display that includes an electrochromic device.

An electrochromic material is a material of which the color and transmittance is altered through oxidation/reduction of the material, and by using this property of the material, an optical shutter that regulates transmission/blocking through the application of an electric field may be produced. By disposing a white reflector or reflective mirror on the rear surface, such an optical shutter may be used in a reflective-type display. The reflective-type display that is realized by disposing the reflective mirror on the rear surface includes a transparent self-light emitting element disposed between the electrochromic optical shutter and the rear surface reflective mirror, and may be used in a combined display in which both of the self-light emitting image and the reflective-type image are realized, but since only a straight-line reflection is generated by the rear surface mirror when the reflective-type image is realized in such a display, the viewing angle of the image is extremely narrow.

In order to overcome this limitation of a narrow viewing angle, an optical diffusion film must be installed on the surface of the display device. However, using the optical diffusion film may cause blurring of the image, and the extent of the blurring that is caused by the optical diffusion film is proportional to the distance between an image-producing layer and the optical diffusion film. Therefore, in order to achieve the image in which blurring is minimized and the wide viewing angle, the distance between the optical diffusion film and the image-producing layer must be minimized. In particular, such a distance between the image and the optical diffusion film is a limitation that may become more severe in a device in which a reflective-type element and the self-light emitting element are manufactured by being coupled as a single body to allow the image to be easily observed without the influence of nearby light. Since the reflective-type element and self-light emitting element are manufactured by being coupled as a single body, there may be several intervening layers between the image-producing layer and the optical diffusion film, and thus the blurring of the image due to the optical diffusion film may become more severely limiting.

SUMMARY

A technical object of the present disclosure is to provide a transmissive-type electrochromic device having a wide viewing angle without an optical diffusion film.

The object of the present disclosure is not limited to the above-described object, and other objects which are not described above will be clearly understood through the following description by those with ordinary skill in the art.

An embodiment of the inventive concept provides an electrochromic device. The electrochromic device includes: a first substrate and a second substrate that face each other; a first electrode on a surface of the first substrate; a second electrode facing the first electrode and disposed on a surface of the second substrate; a first electrochromic layer disposed on the surface of the first electrode and including first scattering particles; a second electrochromic layer facing the first electrochromic layer and disposed on the surface of the second electrode; and an electrolyte layer between the first and second electrochromic layers.

In an embodiment, each of the first scattering particles may include at least one selected from the group consisting of silicon oxide ($SiO_2$), silicon nitride ($Si_3N_4$), aluminum oxide ($Al_2O_3$), titanium oxide ($TiO_2$), and tin oxide ($SnO_2$).

In an embodiment, each of the first scattering particles may have a size of about 300 nm to about 700 nm.

In an embodiment, the second electrochromic layer may include second scattering particles.

In an embodiment, the electrochromic device may further include an additional layer between the first electrochromic layer and the electrolyte layer, or between the second electrochromic layer and the electrolyte layer, wherein the additional layer may include the second particles.

In an embodiment, the electrolyte layer may include the second scattering particles.

In an embodiment, the electrolyte layer may have a thickness of about 25 μm, the second scattering particles may have a size of about 300 nm to about 700 nm, and the content of the second scattering particles may be at least 1.5 vol % with respect to the total volume of the electrolyte layer.

Another embodiment of the inventive concept provides a driving method of the electrochromic device. The driving method of the electrochromic device includes: providing an electrochromic device in which a first electrode, a first electrochromic layer containing scattering particles, an electrolyte layer, a second electrochromic layer, and a second electrode are laminated in sequence; applying a transmission voltage to the first and second electrodes to make each of the first and second electrochromic layers transparent; and scattering of the light emitted on the electrochromic device by the scattering particles while passing through the first electrochromic layer.

In an embodiment, the driving method of the electrochromic device may further include: applying a coloring voltage to the first and second electrodes such that each of the first and second electrochromic layers is colored; and reflection of the light emitted on the electrochromic device by the first or second electrochromic layer.

DETAILED DESCRIPTION

Figure 1:
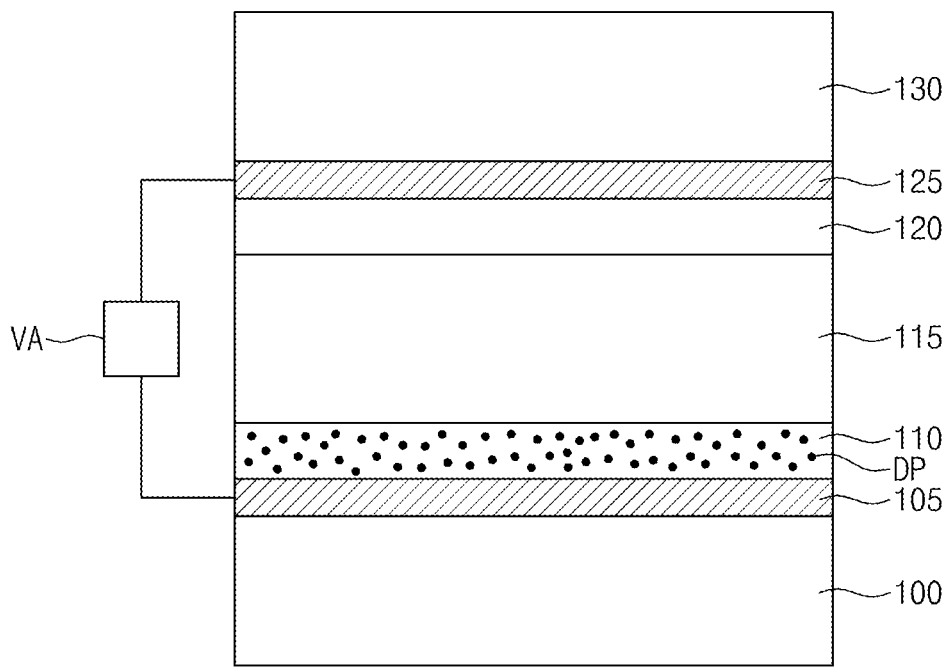
FIGS. 1 to 4 are cross-sectional views illustrating electrochromic devices according to embodiments of the inventive concept.

The above objects, other objects, characteristics, and advantages of the inventive concept may be easily understood through the accompanying drawings and exemplary embodiments. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

In this specification, when an element is being "on" another element, it can be directly on the other element or intervening elements or layers may be present. Moreover, in the drawings, the thickness of the elements are exaggerated for effective description of the technical contents.

Embodiments described in this specification will be described with reference to cross-sectional views and/or plan views which are idealized illustrations of the present invention. In the drawings, the thickness of layers and regions are exaggerated for effective description of the technical contents. Thus, the form of the exemplary drawings may be modified by the manufacturing technique and/or tolerance, and the like. Therefore, embodiments of the present invention are not limited to the specific forms illustrated, and include modified forms produced according to the manufacturing process. For example, an etched region that is illustrated as a right angle may be a shape that is rounded or has a particular curvature. Thus, the regions exemplarily illustrated in the drawings have properties, and the shapes of the regions exemplarily illustrated in the drawings are given to exemplify the specific shape of regions in the device, and do not limit the scope of the invention. Although the terms first, second, etc. are used to describe various elements in the various embodiments of the present invention, these elements should not be limited by those terms. These terms are only used to distinguish one element from another element. The embodiments exemplarily described herein also include the complementary embodiments.

The terminology used herein is for the purpose of describing particular embodiments only and is not intended to be limiting of the invention. As used herein, the singular forms, "a", "an" and "the" are intended to include the plural forms as well, unless the context clearly indicates otherwise.

The terms "includes" and/or "including", when used in this specification, specify the presence of stated elements, but do not preclude the presence of one or more other elements.

Hereinafter, embodiments of the present invention will be explained in detail with reference to the accompanying drawings.

FIGS. 1 to 4 are cross-sectional views illustrating electrochromic devices according to embodiments of the inventive concept.

Figure 2:
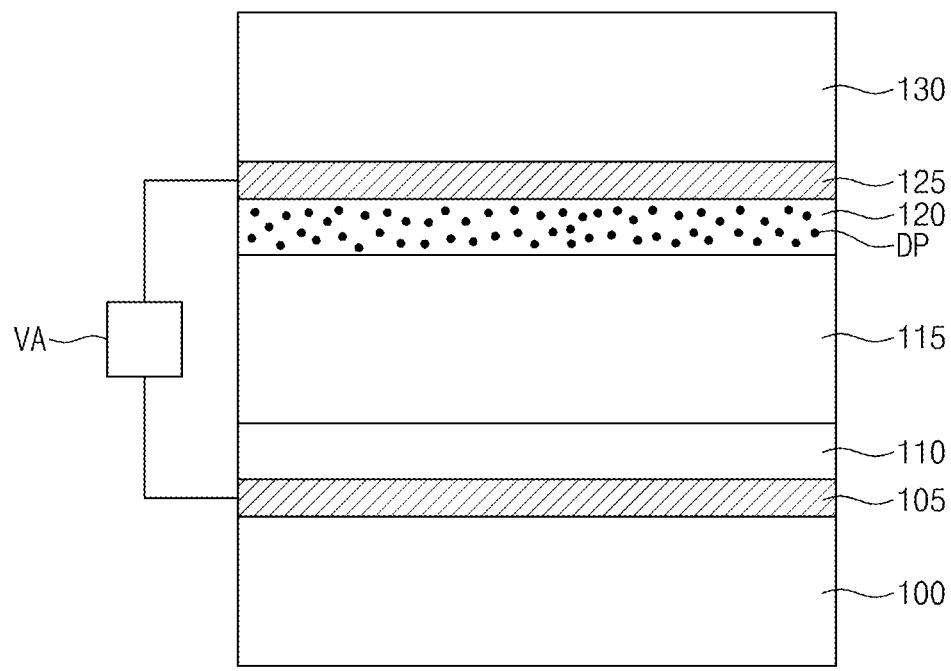
Figure 3:
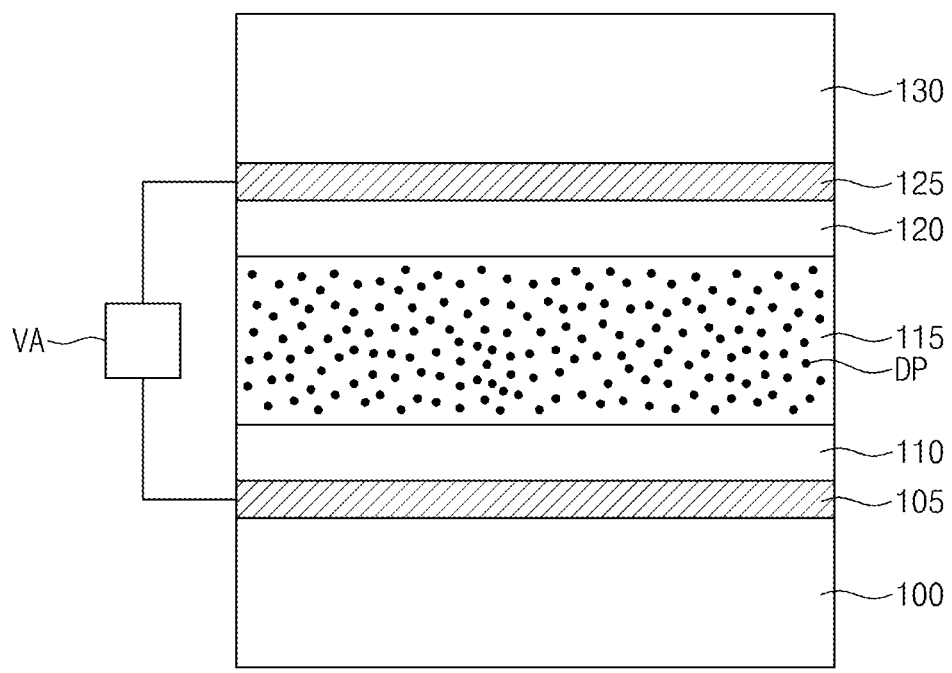

Referring to FIGS. 1 to 3, the electrochromic device may include a first substrate 110, a second substrate 130, a first electrode 105, a second electrode 125, a first electrochromic layer 110, a second electrochromic layer 120, and an electrolyte layer 115.

The first substrate 100 and the second substrate 130 may be disposed to face and be spaced apart from each other. A transparent substrate may be independently used for each of the first substrate 100 and the second substrate 130. Each of the first substrate 100 and the second substrate 130 may contain transparent glass, glass fiber, or plastic, and the plastic may, for example, include at least one of polyacrylate, polyethylene ether phthalate, polyethylene naphthalate, polycarbonate, polyarylate, polyetherimide, polyethersulfone, or polyimide.

The first electrode 105 may be formed on the front surface of the first substrate 100, and the second electrode 125 may be formed on the front surface of the second substrate 130. The front surface of the first electrode 105 and the front surface of the second electrode 125 may face each other. The first electrode 105 and the second electrode 125 may be disposed to face and be spaced apart from each other.

According to an embodiment, a conductive transparent electrode may be used for each of the first electrode 105 and the second electrode 125. For example, each of the first electrode 105 and the second electrode 125 may be an electrode made of any one selected from the group consisting of indium tin oxide (ITO), fluorine tin oxide (FTO), ZnO—Ga$_2$O$_3$, ZnOAl$_2$O$_3$, tin oxide, antimony tin oxide (ATO), zinc oxide, and combinations thereof.

According to another embodiment, the first electrode 105 and the second electrode 125 may be any one selected from the group consisting of an optically transmissive electrode and a reflective non-transparent electrode. When the first electrode 105 and the second electrode 125 are the reflective non-transparent electrode, an embodiment of the inventive concept may be used as a device which is included in a reflective-type optical system. The reflective non-transparent electrode may be any one selected from the group consisting of a metal electrode that contains aluminum or an aluminum-based alloy, and an electrode in which a metal coating layer is formed on an optically transmissive electrode.

Although not illustrated in detail, a spacer may be provided between the first electrode 105 and the second electrode 125, maintain the spacing between the first electrode 105 and the second electrode 125, and perform the role of an encapsulant for the electrolyte layer 115 disposed between the first electrode 105 and the second electrode 125, or the role of a diaphragm between adjacent electrochromic devices.

The electrolyte layer 115 provides ions such as Li$^+$, and the like, which react with the materials in the first electrochromic layer 110 and the second electrochromic layer 120 and are for inducing oxidation/reduction, and may contain a liquid electrolyte or a solid polymer electrolyte. A solution in which a lithium salt such as LiOH or LiClO$_4$, a potassium salt such as KOH, or a sodium salt such as NaOH, and the like, is dissolved in a solvent may be used, for example, as the liquid electrolyte, but the liquid electrolyte is not limited thereto. The solvent may include at least one of propylene carbonate or ethylene carbonate, but is not limited thereto. Poly(2-acrylamino-2-methylpropane sulfonic acid) or poly (ethylene oxide), and the like, may be used as the solid electrolyte, but the solid electrolyte is not limited thereto. Meanwhile, the electrolyte layer 115 may contain a gel-type electrolyte. The gel-type electrode may include poly methylmethacrylate (PMMA).

The first electrochromic layer 110 and the second electrochromic layer 120 include an electrochromic material having the electrochromic property in which the optical absorbance is altered by the electrochemical oxidation reduction reaction, and according to whether a voltage is applied, and the strength of the applied voltage, the electrochemical oxidation reduction effect of the electrochromic material occurs reversibly, and thereby the transparency and optical absorbance of the electrochromic material may be reversibly altered.

As the electrochromic material, a metal oxide electrochromic material including cobalt (Co), tungsten (W), iridium (Ir), nickel (Ni), vanadium (V), indium (In), cesium (Ce), manganese (Mn), niobium (Nb), rhodium (Rh), or ruthenium (Ru), an organic electrochromic material including viologen, quinone, wurster blue, or perylene dimide, or a conductive polymer electrochromic material including polythiophene, polyaniline, polypyrrole, or derivatives thereof may be used, and specifically, the electrochromic material may be any one selected from the group consisting of polythiophene, polyaniline, polypyrrole, polyanthracene, polyfluorene, polycarbazole, polyphenylenevinylene, and derivatives thereof.

According to embodiments of the inventive concept illustrated in FIGS. 1 to 3, scattering particles DP may be included in at least one of the first electrochromic layer 110, the second electrochromic layer 120, or the electrolyte layer 115. The scattering particles DP may scatter and not absorb the light in the visible light wavelength range. The scattering particles DP may have a different refractive index than the first electrochromic layer 110 and the second electrochromic layer 120. According to an aspect, the amount of the scattering particles DP may be regulated according to the difference in the refractive index between the first and second electrochromic layer 110 and 120, and the scattering particles DP. For example, when the difference in the refractive index decreases, a greater amount of the scattering particles DP may be added to increase the scattering efficiency.

Each of the scattering particles DP may include at least one selected from the group consisting of silicon oxide ($SiO_2$), silicon nitride ($Si_3N_4$), aluminum oxide ($Al_2O_3$), titanium oxide ($TiO_2$), and tin oxide ($SnO_2$). However, an embodiment of the inventive concept does not limit the type of scattering particles DP to the above-described materials.

According to an embodiment, each of the scattering particles DP may have a size of about 200 nm to about 1000 nm. When the size of the scattering particles DP is less than about 200 nm, a similar fraction of the light is forward and backward scattered, and thus it may be difficult to achieve an efficient diffuse forward scattering. Conversely, when the particle size of the scattering particles DP is greater than about 1000 nm, the scattering of the light may be excessively focused in a straight-line direction such that the diffuse transmission effect is reduced. Therefore, each of the scattering particles DP may have a size of about 200 nm to about 1000 nm so that the diffuse transmission effect may be maintained while generating forward scattering. More desirably, each of the scattering particles DP may have a size of about 300 nm to about 700 nm.

Here, the forward scattering indicates that when light is emitted on the second substrate 130, the light scattered by the scattering particles DP included in at least one of the first electrochromic layer 110, the second electrochromic layer 120, or the electrolyte layer 115 is scattered through the first substrate 110. Conversely, backward scattering indicates reflection.

According to the embodiment illustrated in FIG. 1, the scattering particles DP may be dispersed in the first electrochromic layer 110. According to the embodiment illustrated in FIG. 2, the scattering particles DP may be dispersed in the second electrochromic layer 120. The scattering particles DP in the first electrochromic layer 110 may differ in type and size from the scattering particles DP in the second electrochromic layer 120, or may also be the same type and size.

A process of dispersing the scattering particles DP in at least one of the first electrochromic layer 110 or the second electrochromic layer 120 is as follows. According to an embodiment, nanostructures may be coupled onto the first electrode 105, and the scattering particles DP may be dispersed while forming the nanostructure. Next, the electrochromic materials may be fixed onto the surface of each of the nanostructures in which the scattering particles DP are dispersed.

According to another embodiment illustrated in FIG. 3, the scattering particles DP may be dispersed in the electrolyte layer 115. The scattering particles DP respectively dispersed in the first electrochromic layer 110, the second electrochromic layer 120, and the electrolyte layer may be the same type and size as each other, or may also differ in type and size from each other.

A process of dispersing the scattering particles DP in the electrolyte layer 115 is as follows. A dispersing agent and the scattering particles DP may be injected to obtain a stable dispersion of the scattering particles DP in an organic solvent. Here, the dispersing agent may include poly(acrylic acid), but is not limited thereto.

Figure 4:
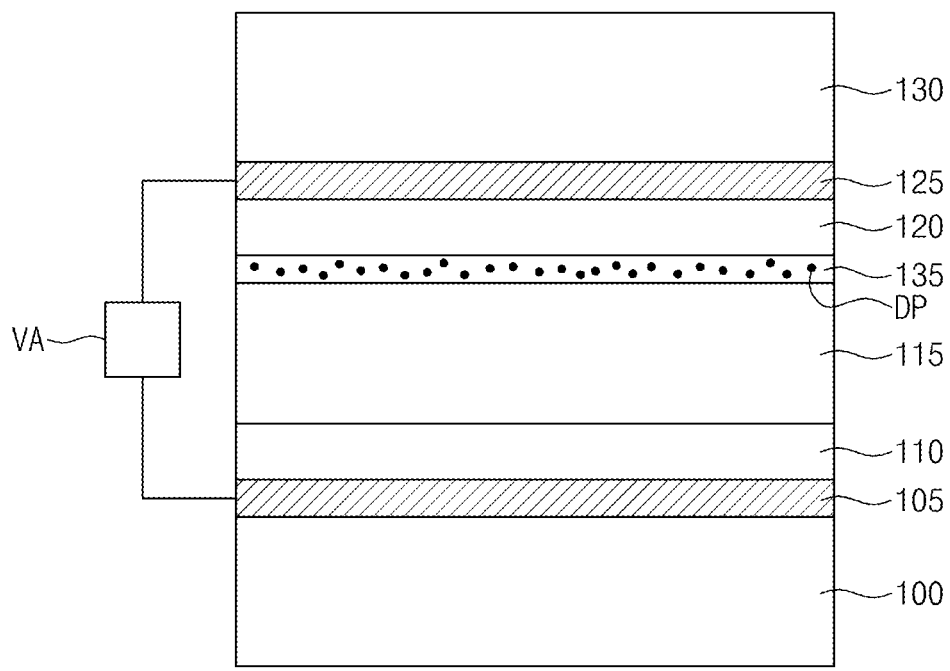

According to still another embodiment illustrated in FIG. 4, an additional layer 135 disposed between the electrolyte layer 115 and the first electrochromic layer 110 or second electrochromic layer 120 may be further included. The additional layer 135 may be composed of the scattering particles DP. The additional layer 135 may be divided from the other layers.

Here, when the first electrochromic layer 110 or the second electrochromic layer 120 contains titanium oxide ($TiO_2$) nanostructures, the size of each of the titanium oxide ($TiO_2$) nanostructures is 20 nm or smaller, and the scattering particles DP in the additional layer 135 may be provided to have a size of between about 200 nm to about 1000 nm. The scattering particles DP respectively dispersed in the first electrochromic layer 110, the second electrochromic layer 120, and the electrolyte layer 135 may be the same type and size as each other, or may also differ in type and size from each other.

The scattering particles DP may include at least one selected from the group consisting of the first and second electrochromic layers 110 and 120, the electrolyte layer 115, and the additional layer 135.

Figure 5:
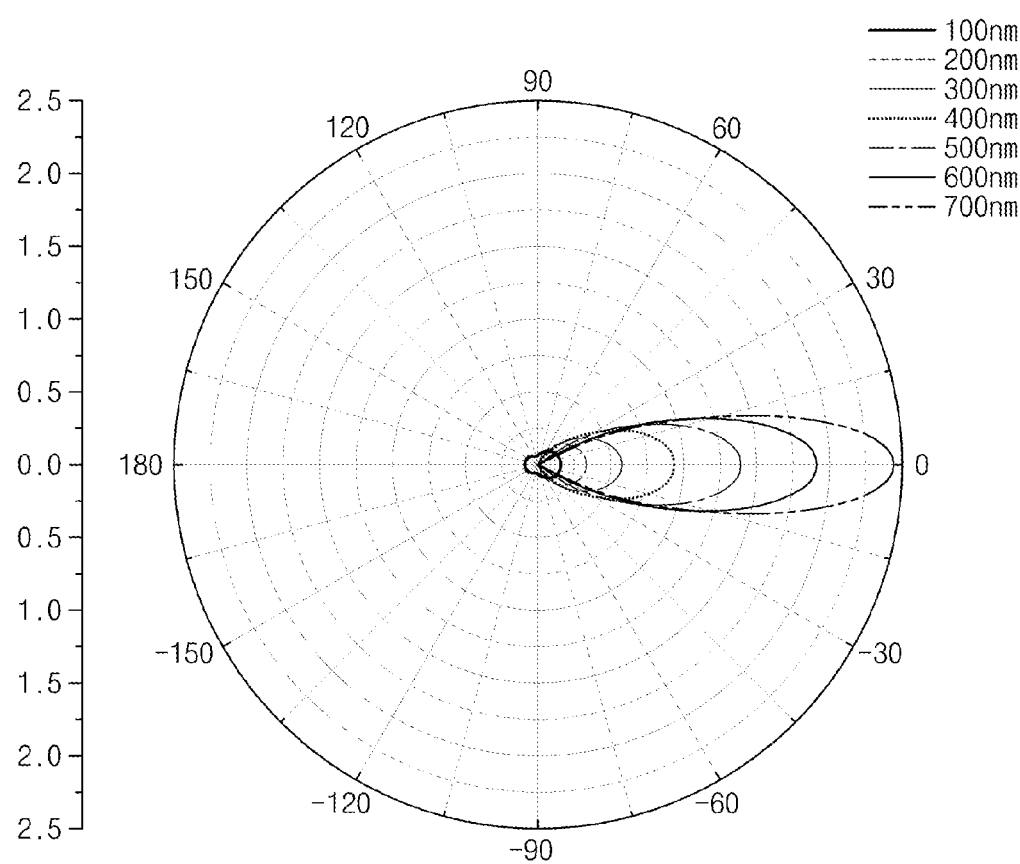
FIG. 5 is a graph illustrating the distribution of the angles at which light is scattered according to the size of scattering particles.

FIG. 5 is a graph illustrating the distribution of the angles at which light is scattered according to the size of the scattering particles Referring to FIGS. 1 to 3 and 5, the scattering particles DP are added to the first electrochromic layer 110, the second electrochromic layer 120, and the electrolyte layer 115. For example, each of the first electrochromic layer 110 and the second electrochromic layer 120 may include viologen that is fixed onto the surface of titanium nitride nanostructures. Moreover, the electrolyte layer 115 may include propylene carbonate, and the thickness of the electrolyte layer 115 may be about 25 μm. Each of the scattering particles DP may contain silicon nitride ($Si_3N_4$).

Description is given of the angle at which incident light is scattered by the scattering particles when the respective sizes of the scattering particles are 100 nm, 200 nm, 300 nm, 400 nm, 500 nm, 600 nm, and 700 nm.

As illustrated in FIG. 5, when the size of the scattering particles is 100 nm, and thus small, the characteristics of Rayleigh scattering are exhibited, and the strengths of the forward and backward scattering exhibit substantially identical properties. When the size of the scattering particles is increased, the characteristics of the Mie scattering range are exhibited, forward scattering becomes stronger, and overall, the distribution of the scattered light exhibits the tendencies of forward scattering.

Therefore, when the size of the scattering particles is small, the transmittance may be reduced because the fraction of backward scattering is large, and conversely, when the size of the scattering particles is extremely large, the backward scattering is small but the forward scattering is excessively large, and thus the effect of the diffuse transmission may be reduced.

Referring to FIG. 5, a particle size distribution of the scattering particles between about 200 nm to about 2000 nm is desirable, and the scattering particles in the range of about 200 nm to about 1000 nm exhibit the most favorable properties.

Meanwhile, when the size of the scattering particles is extremely small, the scattering efficiency is extremely low, and thus there is a limitation in that the amount of scattering particles added must be increased.

Figure 6:
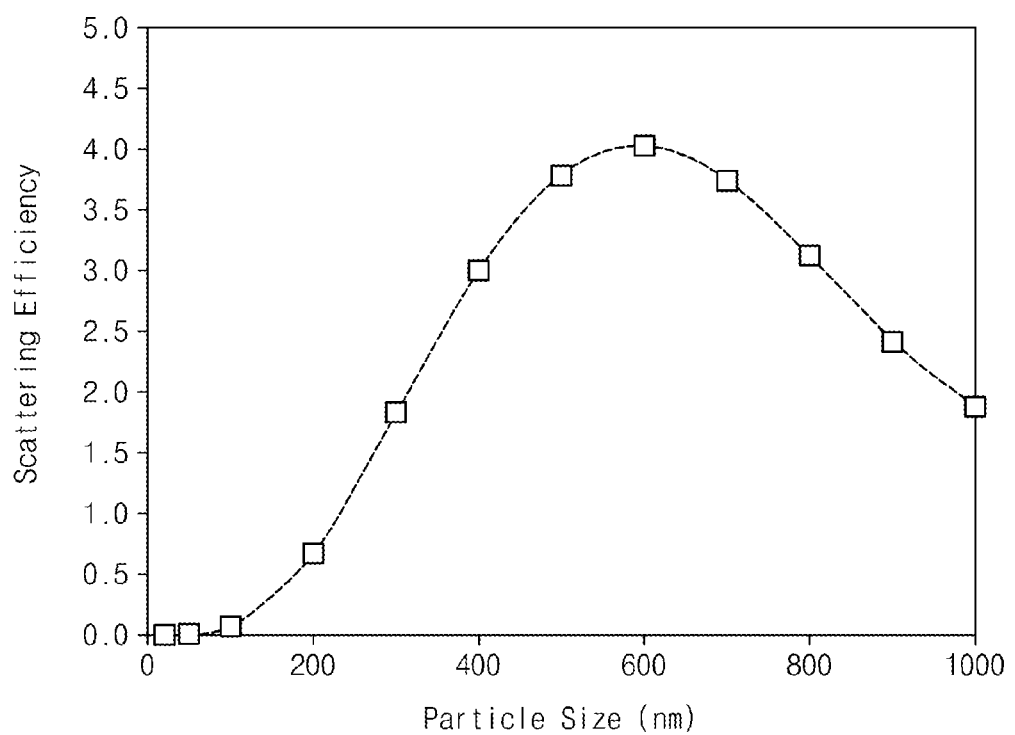
FIG. 6 is a graph illustrating the scattering efficiency according to the size of scattering particles.

FIG. 6 is a graph illustrating the scattering efficiency according to the size of the scattering particles.

FIG. 6 shows measurements of the scattering efficiency according to the size of the scattering particles after emitting light having a wavelength of about 550 nm on a device in which the medium is propylene carbonate and each of the scattering particles contains silicon nitride.

Referring to FIG. 6, the scattering efficiency indicates the ratio between the physical cross-sectional area and the effective scattering cross-sectional area, and indicates that the higher the scattering efficiency, the more the scattering is generated and the weaker the light that passes through without scattering. As illustrated in FIG. 6, the smaller the size of the scattering particles, the lower the scattering efficiency, which indicates that most of the incident light passes through without being scattered.

The maximum scattering efficiency is realized in the electrochromic device containing scattering particles that have a size of about 600 nm. The large scattering efficiency indicates that since most of the incident light is scattered, sufficient scattering may be obtained even when using a small amount of the scattering particles.

Figure 7:
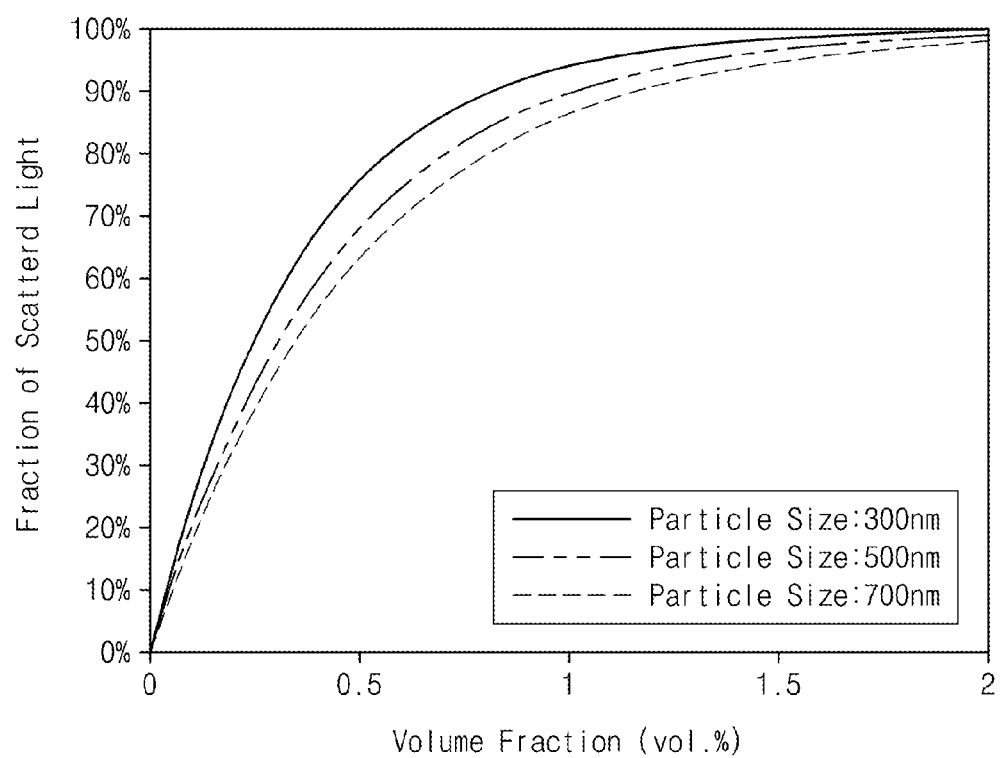
FIG. 7 is a graph illustrating the fraction of light that is scattered while passing through an electrochromic device according to the amount of scattering particles added, for a case in which silicon nitride is added to an electrolyte layer and thus used as the scattering particle.

FIG. 7 is a graph illustrating the fraction of light that is scattered while passing through the electrochromic device according to the amount of scattering particles added.

Referring to FIGS. 1 to 3 and 7, according to the present embodiment, in the electrochromic device composed of the first electrochromic layer 110, the second electrochromic layer 120, and the electrolyte layer 115, the scattering particles DP are added to the electrolyte layer. For example, each of the first electrochromic layer 110 and the second electrochromic layer 120 may include viologen that is fixed onto the surface of titanium nitride nanostructures. Moreover, the electrolyte layer 115 contains propylene carbonate, and the thickness of the electrolyte layer 115 may be about 25 μm. Each of the scattering particles DP may contain silicon nitride ($Si_3N_4$). After adding about 0.1 to about 2 vol % of scattering particles having sizes of 300 nm, 500 nm, and 700 nm into the first electrochromic layer 110, the second electrochromic layer 120, and the electrolyte layer 115, the fraction of light that is scattered is observed. When the scattering particles DP are added such that the condition of the amount added is about 0.5 vol % or less, the increase in the scattered light according to the amount added is steep, and when about 1.0 vol % of the scattering particles DP is added, the scattered light is about 90% or higher, that is, most of the incident light is scattered. When 1.5 vol % or more of the scattering particles DP is added, most of the incident light is scattered, and thus the increase in the scattered light is insignificant even when the amount of the scattering particles added is increased. Adding an excessively large amount of the scattering particles may generate multiple scattering in the electrochromic device such that the amount of light that is scattered backward is increased. Therefore, in the present condition, it may not be desirable to add 1.5 vol % or more of the scattering particles DP. Instead, since a significant level of scattering is generated even when the low amount of about 0.5 vol % is added, it is possible to achieve a sufficient viewing angle. In particular, in many cases an optical shutter is used in a form that uses a round-trip path, and in this case, the fraction of the scattered light is further increased, thus allowing a sufficient viewing angle to be obtained, even when the amount of the scattering particles DP added is about 0.5 vol % or lower. The amount of the scattering particles DP added changes according to variables such as the size of the scattering particles DP, the refractive index of the scattering particles DP and the medium, and the distance of the light path, and the like, and the scattering particles DP are used in accordance to the respective conditions.

Referring to FIGS. 5 to 7, the size of each of the scattering particles DP is in the range of about 200 nm to about 1000 nm, and the content of the scattering particles DP may be about 1.5 vol % or lower when the scattering particle is silicon nitride and added to the propylene carbonate medium having a thickness of about 25 μm, and more desirably, the content may be about 0.5 vol % or lower. When the thicker electrolyte layer is used, the amount of the scattering particles which are needed may be further reduced.

Figure 8:
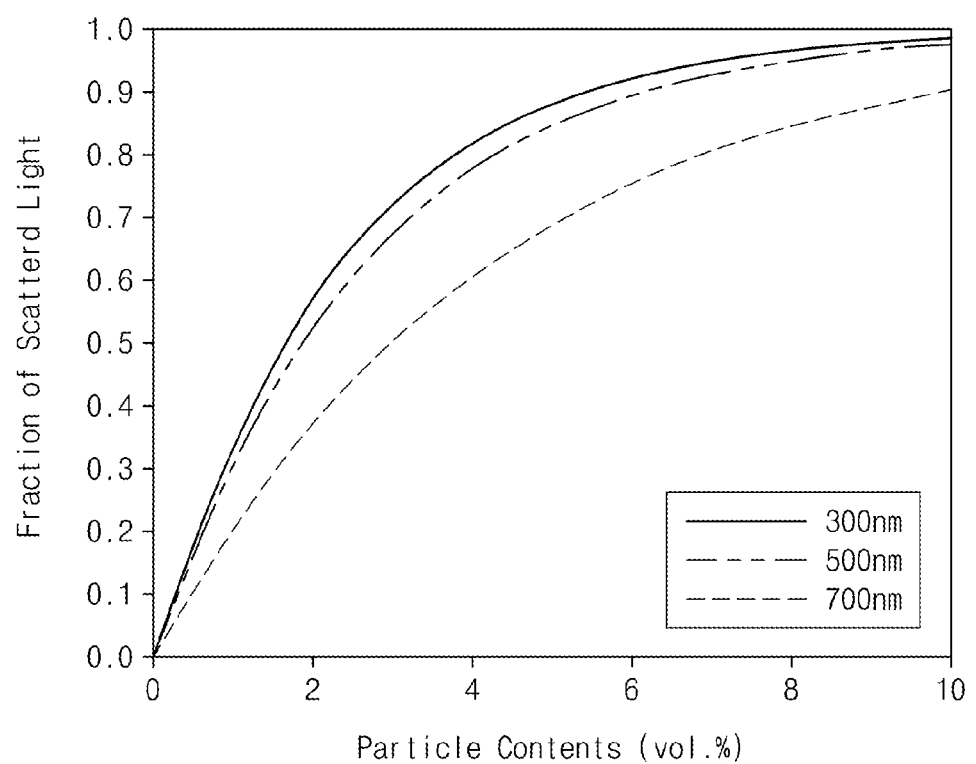
FIG. 8 is a graph illustrating the fraction of light that is scattered while passing through an electrochromic device according to the amount of the scattering particles added, for a case in which silicon nitride is added to a titanium nitride (TiO$_2$) nanostructure and thus used as the scattering particle.

FIG. 8 is a graph illustrating the fraction of light that is scattered while passing through an electrochromic device according to the amount of the scattering particles added, for a case in which silicon nitride is added to a titanium nitride ($TiO_2$) nanostructure and thus used as the scattering particle.

Referring to FIG. 8, the $TiO_2$ nanostructure is composed of about 25 vol % of $TiO_2$ nanoparticles and about 75 vol % of propylene carbonate, and the thickness of the nanostructure is about 6.5 μm. Since in the present experimental example, the thickness of the layer to which the scattering particles are added is about 6.5 μm, and thus thin, a comparatively larger amount is required to be added than when adding the scattering particles to the electrolyte layer. As may be seen in FIG. 11, when the particle size of the scattering particles is small, the scattering efficiency is reduced, and thus it is necessary to increase the amount of the scattering particles added. When the particle size of the scattering particles is about 500 nm to about 700 nm, the fraction of the scattered light may be estimated to be on the level of about 90% when the amount of the scattering particles added is about 6 vol %. When the device is used as the round-trip path, sufficient scattering is possible even under the condition in which the amount added is lower than this. In the case of the present experimental example, when the device is used as the round-trip path, it is possible to obtain a sufficient viewing angle even when the amount added is about 5 vol % or lower. When the thicker nanostructure layer is used, the amount of the scattering particles needed may be further reduced, and when the thinner nanostructure layer is used, the amount of the scattering particles needed may be further increased.

According to embodiments in accordance with the inventive concept, by dispersing scattering particles in at least one of a first electrochromic layer, a second electrochromic layer, an electrolyte layer, or an additional layer, light may be efficiently scattered in the forward direction to improve the viewing angle. Here, by appropriately selecting the particle size of the scattering particles, scattering in the backward direction may be suppressed, and the scattering direction of the light may be controlled so as to be in the forward direction.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Thus, the above-described exemplary embodiments are entirely exemplary, and should not be construed as limiting.

What is claimed is:

1. An electrochromic device comprising:
    a first substrate and a second substrate that face each other; a first electrode on a surface of the first substrate;
    a second electrode facing the first electrode and disposed on a surface of the second substrate;
    a first electrochromic layer on the surface of the first electrode; a second electrochromic layer facing the first electrochromic layer and disposed on the surface of the second electrode; and
    an electrolyte layer between the first and second electrochromic layers,
    wherein light scattering particles are dispersed in at least one selected from the group consisting of the first and second electrochromic layers, and the electrolyte layer.

2. The electrochromic device of claim 1, wherein each of the scattering particles includes at least one selected from the group consisting of silicon oxide ($SiO_2$), silicon nitride ($Si_3N_4$), aluminum oxide ($Al_2O_3$), titanium oxide ($TiO_2$), and tin oxide ($SnO_2$).

3. The electrochromic device of claim 1, wherein each of the scattering particles has a size of 200 nm to 1000 nm.

4. The electrochromic device of claim 1, further comprising an additional layer between the first electrochromic layer and the electrolyte layer, or between the second electrochromic layer and the electrolyte layer,
    wherein the scattering particles are dispersed in at least one selected from the group consisting of the first and second electrochromic layers, the electrolyte layer, and the additional layer.

5. The electrochromic device of claim 1, wherein light is emitted from the rear surface of the second substrate, and the light is scattered by the scattering particles to the first substrate.

6. The electrochromic device of claim 1, wherein the amount of the scattering particles is regulated according to the difference between the refractive indices of the first and second electrochromic layers and the electrolyte layer, and the refractive index of the scattering particles.

7. The electrochromic device of claim 6, wherein the amount of the scattering particles is increased when the difference between the refractive indices of the first and second electrochromic layers and the electrolyte layer, and the refractive index of the scattering particles is small.

* * * * *